C. E. MANNING.
METEOROLOGICAL INSTRUMENT.
APPLICATION FILED APR. 20, 1917.
1,319,599.
Patented Oct. 21, 1919.
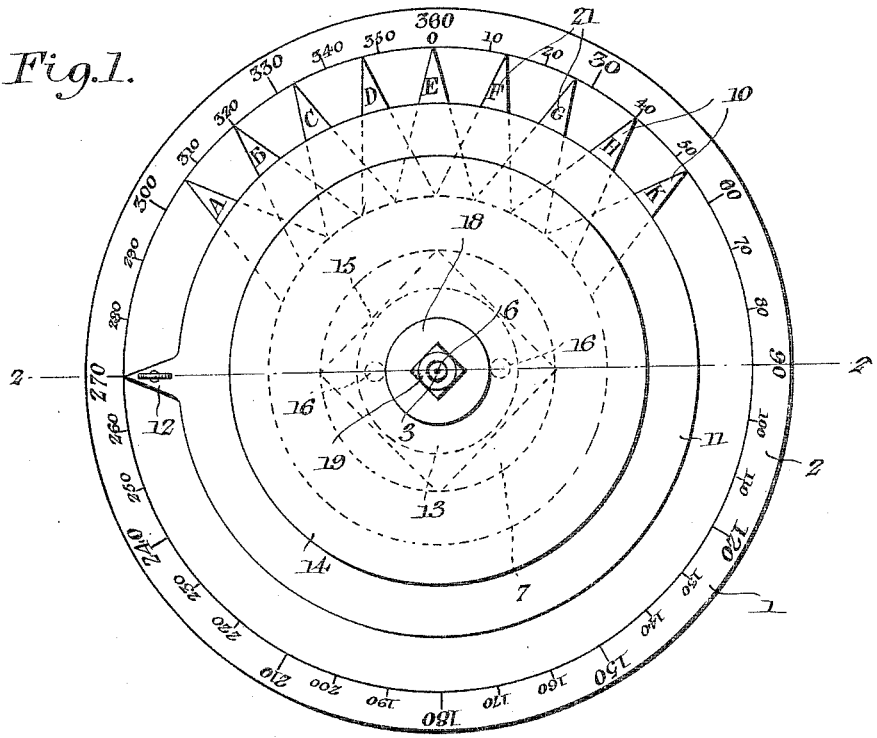
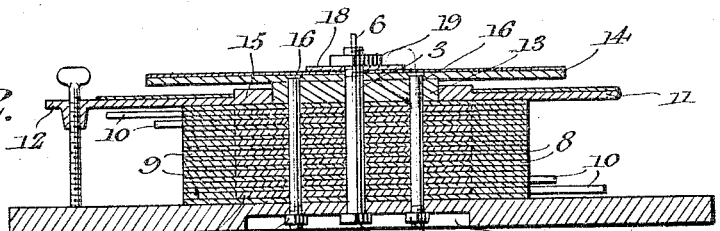
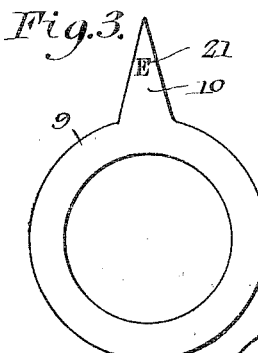
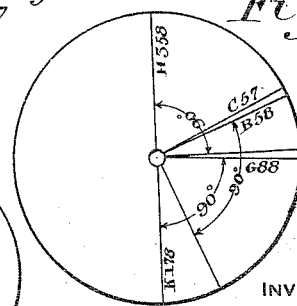
WITNESSES
Frederick W. Ely
INVENTOR
Charles E. Manning.
BY Victor J. Evans
ATTORNEY

UNITED STATES PATENT OFFICE.

CHARLES E. MANNING, OF PHILADELPHIA, PENNSYLVANIA.

METEOROLOGICAL INSTRUMENT.

1,319,599.   Specification of Letters Patent.   Patented Oct. 21, 1919.

Application filed April 20, 1917. Serial No. 163,504.

*To all whom it may concern:*

Be it known that I, CHARLES E. MANNING, a citizen of the United States, residing at Philadelphia, in the county of Philadelphia and State of Pennsylvania, have invented new and useful Improvements in Meteorological Instruments, of which the following is a specification.

This invention relates to new and useful improvements in meteorological instruments, and has for an object to provide a device for indicating and producing specific diagrams of the center lines of magnetic stress, which obtain upon the surface of the earth, due to the magnetic flux between the latter and the various members of the solar system.

Another object of the invention resides in an indicator which shows the angular relations of the center lines of magnetic flux, which exist at all times between any two or more magnets: for example, the earth is a magnet, and each of the large members of the solar system is, as shown by the spectroscope to have magnetic substances, it is therefore evident that lines of magnetic flux obtain between each two of such large bodies.

A further object is to provide a convenient table or base upon which to draw specific diagrams of the locations of the center lines of magnetic stress which exist in the earth's surface.

A still further object is to provide a duplex base upon which to compare or contrast two or more radial diagrams of the directions and angular relations which obtain between the center lines of magnetic flux.

Other objects of the invention are to provide an instrument for the use of observatories and meteorological stations, or for class or individual use, which instrument is designed for indicating and illustrating magnetic conditions which exist at the times of magnetic storms; and to provide a numerical tabular form showing the directions of the center lines of magnetic flux, by which to set index pointers at various times, in order that the pointers will indicate the general magnetic direction of conditions prevailing.

With these and other objects in view, as will appear as the description proceeds, the invention accordingly consists in the novel features of construction, combination of elements and arrangement of parts illustrated in the accompanying drawing, and more particularly pointed out in the appended claims.

In the drawing wherein has been shown one of the preferred embodiments of the invention;

Figure 1 is a plan view of the meteorological instrument comprising the present invention.

Fig. 2 is a vertical sectional view taken along the line 2—2 of Fig. 1.

Fig. 3 is a plan view of one of the index pointers detached from the instrument.

Fig. 4 is a magnetic diagram of the center lines of flux at the date of April 18, 1906, when the earthquake shock took place at and about San Francisco, California.

Fig. 5 is a specimen of the tabular form, utilized by the present invention, giving the numerical values of the directions of the center lines of magnetic flux for the month of January, 1917.

Similar characters of reference denote corresponding parts throughout the several views of the drawing.

Referring more particularly to the drawing, the numeral 1 designates the foundation or base plate utilized for the general support of the mechanism employed by the invention. Said plate may be made from metal or such composition as will best serve the purpose or purposes for which it is used. The upper peripheral edge of the plate has engraved, cut or printed thereon a circular form of scale indications 2, which is graduated into equal subdivisions of degrees, or similar indicia by which to indicate angular directions. Mounted upon the plate 1 and extending upwardly therefrom is a central pivot bolt 3, which has a square head 4 positioned within a countersunk area 5, formed within the lower surface of the plate 1. The extreme upper end of the bolt 3 is provided with a pin 6, the purpose of which will appear as the description proceeds.

Positioned upon the upper surface of the plate 1 in superposed relation is a plurality of non-rotatable washers 7 and 8, and surrounding the washers 7 is a plurality of index hands or pointers 9, which are adapted to freely rotate about said washers, and in concentric relation with the bolt 3, so that the protruding fingers 10 of said pointers will travel contiguous to the scale or form 2, as clearly shown in Fig. 1. The washers 8 are employed to separate the index hands from each other, so that the motion thereof will be entirely independent of each other, no two hands coming in contact.

A circular lower diagram plate 11 covers the upper index hand, and is provided with an index pointer 12. This plate revolves about a central washer 13, which is slightly smaller in diameter than the washers 8. Said washer 13 is, as shown in Fig. 2, thicker than the diagram plate 11, so that a sheet of paper placed thereon will revolve in synchronism with it, and free from the upper diagram plate 14 positioned above it. In order to insure the synchronous rotation of the said sheet of paper with the plate 11, the latter is provided with an integral, elevated and squared portion 15, which is adapted to be fitted within a squared opening formed in the sheet of paper carried by said plate.

The upper diagram plate 14 rests upon the upper surface of the washer 13, and is thereby spaced from the plate 11. A plurality of bolts 16 passes through the plate 14, and through the washers 7, 8 and 13, so as to prevent the latter elements from rotating about the bolt 3. The lower extremities of the bolts 16 are adapted to receive securing nuts 17 which are positioned within the countersunk recess 5 formed in the plate 1, so as not to interfere with the positioning of the instrument upon a suitable support. The plate 14 is adapted to receive upon its upper surface a main diagram sheet of paper which is provided with a central opening for the reception of the upper end of the bolt 3. A small washer and nut 18 are carried by the upper end of the bolt 3 and are utilized to secure the sheet to the plate 14. The pin 6 of the pivot bolt 3 extends above the securing washer and nut, so as to provide a center, upon which may be placed a straight edge (not shown) for drawing radial lines upon the diagram sheets.

From the foregoing description of the invention, it is thought that the following explanation relative to its mode of operation will be readily understood. The first step in operating the instrument is to place the two diagram paper blanks upon the plates 11 and 14, and these are retained in place by screwing the nut 19 down upon the bolt 3. Then set the index hands 9 by the numbers obtained from the tabular form 20 shown in Fig. 5; then with any radial straight edge and pencil the lines are drawn across both diagram papers, the lines being defined by the positions of the pointers 10. Now, to determine the angular relation between any two lines, the lower diagram plate is revolved so that the relation can be read at sight by noting the travel of the index hand 12 over the scale indications 2 of the plate 1. The pointing elements 10 of the index hands 9 have letters 21 printed thereon, so as to discriminate between them. After a diagram has been made, it may be dated and filed for future reference, being afterward compared with other diagrams to determine the relative magnetic potentials existing at various times and to compare the conditions existing upon the earth at such times. When a diagram is taken the respective lines are lettered in accordance with the index hand employed to define the lines, as shown in Fig. 4.

The tabular form 20 shown in Fig. 5, is obtained from calculations of the positions of the center lines of magnetic stress which obtain at various periods and is intended to be a simple method of showing the relative positions of such lines upon stated dates. The data upon this form are derived from astronomical calculations of places of the various members of the solar system as found in the United States *Nautical Almanac*. The method of performing these calculations consists of regarding the earth as an instantaneous kinematic center and projecting the various members of the system upon the plane of the ecliptic for each date represented in the form.

Fig. 4 shows the diagram for the time of the earthquake in California, which occurred in 1906. In this the line H was exactly opposite to K, and at right angles to two other lines. The results of such fluctuating conditions would show violent changes in magnetic stresses, as the various fluxes opposing and clashing with each other result in magnetic storms on the earth's surface, which may be the basis for atmospheric changes, and other climaxes in natural phenomena at present not entirely explained or understood.

From the foregoing it will be observed that there is provided an instrument in which the objects of the present invention have been achieved, and that all of the advantageous features above mentioned are, among others, present. The device can be readily manipulated, and by reason of its simple construction is not likely to become out of order. It will of course be understood that slight structural alterations may be made in the instrument from that illustrated and described, and that such changes will not depart from the scope or intent of the invention.

What is claimed as new is:

1. A meteorological instrument for indicating the directions of the center lines of magnetic stress upon the surface of the earth, comprising a plurality of index pointers rotatably mounted upon a base, and moving substantially over a graduated circle, and means whereby said pointers may be manually set so as to indicate the directions of the center lines of magnetic stress, substantially as described.

2. A meteorological instrument for producing diagrams of the directions of the center lines of magnetic stress, regarding the earth as an instantaneous center, comprising a diagram plate mounted for rotation about a bolt element, and having an index pointer on the periphery thereof which travels over a graduated circle, substantially as described.

3. An instrument for contrasting or comparing two radial diagrams of the center lines of magnetic flux, composed of two diagram plates mounted for rotation about a central axis, the lower of said plates having a raised squared portion for the reception of a paper blank, and an index hand carried by said lower plate and adapted to travel over a graduated circle.

4. In combination, an instrument for indicating the directions of the center lines of magnetic stress, comprising a base, a plurality of index pointers rotatably mounted about an axis formed with said base, one or more diagram plates associated with said axis and superposed above said index pointers, and means carried by said plates for holding blanks of paper thereon, upon which to trace the directions of the radial lines, so as to form specific record diagrams, substantially as described.

5. In combination, a tabular form or chart containing numbers, a plurality of index pointers rotatably mounted upon a base, a graduated scale carried by said base, whereby said pointers may be moved to different positions upon said base by data secured from said form or chart, to indicate the directions of center lines of magnetic stress, and diagram plates carried by said base upon which to draw radial diagrams for recording such positions, substantially as described.

6. An instrument for contrasting or comparing the radial diagrams of the center lines of magnetic flux, embodying a base, two diagram plates mounted for rotation about a central axis carried by said base, a plurality of index pointers rotatably mounted upon said axis and spacing said plates from the base, means for connecting the topmost plate to the base, means whereby the lowermost plate may be independently rotated and means carried by the lowermost plate and engageable with the base for holding the former against rotation.

In testimony whereof I affix my signature.

CHARLES E. MANNING.

Copies of this patent may be obtained for five cents each, by addressing the "Commissioner of Patents, Washington, D. C."